(12) United States Patent
Brockhoff et al.

(10) Patent No.: US 10,537,962 B2
(45) Date of Patent: Jan. 21, 2020

(54) RETAINING DEVICE, MACHINING DEVICE AND METHOD

(71) Applicant: KUKA Deutschland GmbH, Augsburg (DE)

(72) Inventors: Per-Olaf Brockhoff, Friedberg (DE); Christian Goldstein, Friedberg (DE); Bernd Richter, Königsbrunn (DE)

(73) Assignee: KUKA DEUTSCHLAND GMBH, Augsburg (DE)

( * ) Notice: Subject to any disclaimer, the term of this patent is extended or adjusted under 35 U.S.C. 154(b) by 138 days.

(21) Appl. No.: 15/526,191

(22) PCT Filed: Nov. 12, 2015

(86) PCT No.: PCT/EP2015/076407
§ 371 (c)(1),
(2) Date: May 11, 2017

(87) PCT Pub. No.: WO2016/075222
PCT Pub. Date: May 19, 2016

(65) Prior Publication Data
US 2017/0326678 A1 Nov. 16, 2017

(30) Foreign Application Priority Data
Nov. 13, 2014 (DE) .................. 20 2014 105 464 U

(51) Int. Cl.
*B23K 37/04* (2006.01)
*B23K 20/12* (2006.01)
*B25J 9/00* (2006.01)

(52) U.S. Cl.
CPC ............ *B23K 20/126* (2013.01); *B23K 37/04* (2013.01); *B25J 9/0096* (2013.01)

(58) Field of Classification Search
None
See application file for complete search history.

(56) References Cited

U.S. PATENT DOCUMENTS

| 4,955,119 | A | * | 9/1990 | Bonomi | ................... B21J 15/10 227/58 |
| 4,995,148 | A | * | 2/1991 | Bonomi | ................... B21J 15/10 29/26 A |
| 5,484,181 | A | * | 1/1996 | Saadat | ..................... B25J 9/144 294/115 |
| 6,430,796 | B1 | * | 8/2002 | Jones | ....................... B21J 15/10 29/243.53 |

(Continued)

FOREIGN PATENT DOCUMENTS

| CN | 103658967 A | 3/2014 |
| DE | 10 2004 062997 A1 | 7/2006 |

(Continued)

*Primary Examiner* — Devang R Patel
(74) *Attorney, Agent, or Firm* — McGlew and Tuttle, P.C.

(57) ABSTRACT

A retaining device (3) is provided for a workpiece (7), which is machined by an industrial robot (2), including a machining tool (4), along a machining path (16). The retaining device (3) includes a clamping tool (5) for clamping tool parts (13, 14) on the machining path (16) and a multi-axis guiding device (6) for the clamping tool (5) and for the independent movement thereof relative to the workpiece (7) during the machining process.

18 Claims, 6 Drawing Sheets

(56) References Cited

U.S. PATENT DOCUMENTS

| | | | |
|---|---|---|---|
| 2004/0037689 A1* | 2/2004 | Watanabe | B25J 9/1697 414/730 |
| 2004/0056497 A1* | 3/2004 | Ghuman | B23P 21/004 296/1.01 |
| 2007/0023410 A1* | 2/2007 | Sarabia Trilla | B23K 37/0408 219/161 |
| 2009/0249606 A1* | 10/2009 | Diez | B23K 11/11 29/428 |
| 2014/0069987 A1 | 3/2014 | Mialhe et al. | |
| 2017/0001734 A1* | 1/2017 | Darras | B23P 21/002 |

FOREIGN PATENT DOCUMENTS

| | | |
|---|---|---|
| DE | 10 2006 029 292 A1 | 12/2007 |
| EP | 1 864 747 A1 | 12/2007 |
| EP | 2 724 810 A1 | 4/2014 |
| GB | 2 385 817 A | 9/2003 |
| GB | 2 395 156 A | 5/2004 |
| JP | 2000 202645 A | 7/2000 |

\* cited by examiner

Fig. 3

RETAINING DEVICE, MACHINING DEVICE AND METHOD

CROSS REFERENCE TO RELATED APPLICATIONS

This application is a United States National Phase Application of International Application PCT/EP2015/076407, filed Nov. 12, 2015 and claims the benefit of priority under 35 U.S.C. § 119 of German Application 20 2014 105 464.2, filed Nov. 13, 2014, the entire contents of which are incorporated herein by reference.

FIELD OF THE INVENTION

The present invention pertains to a retaining device for a preferably elongated, multipart workpiece which can be machined by an industrial robot comprising a machining tool along a machining path, and to a method.

BACKGROUND OF THE INVENTION

Clamping a multipart workpiece on a machining path with a clamping tool in a stationary and enclosing manner and subsequently machining the multipart workpiece with an industrial robot and a machining tool along a machining path is known from practice.

SUMMARY OF THE INVENTION

An object of the present invention is to provide an improved retaining technology for a multipart workpiece.

The retaining technology according to the invention, i.e., the retaining device and the retaining method, have the advantage that the workpieces to be machined can be clamped locally at the machining point, and the clamping point moves along synchronously with the machining feed. As a result, the retaining technique can be minimized, simplified and reduced in price, on the one hand. Special advantages are now obtained for elongated workpiece parts, which are butt jointed at their parallel longitudinal edges, clamped and also machined. The contact and clamping area of the workpiece parts can form or define the machining path.

The retaining technology may also be used for workpieces, which have a positive-locking joining zone, e.g., extruded profiled sections, as they are used in railway car construction, ship building or vehicle construction.

The retaining technology according to the invention is suitable for different machining processes. There are special advantages in joining processes, especially welding processes. The retaining technology according to the invention may be used especially successfully in friction stir welding, wherein the workpiece parts are also welded at the contact area and clamping area.

The retaining device may comprise a clamping tool and a multi-axis guiding device for the clamping tool. As a result, the clamping tool can be moved independently along the machining path of the workpiece parts. This can take place by means of a drive of its own. Any workpiece defects, especially formal defects, positioning errors, or the like can be compensated during the feed of the clamping tool along the machining path.

On the other hand, the machining tool, especially the tool-guiding industrial robot, can by tracked by the clamping tool by means of a detection technique. When the position of the workpiece parts and accordingly also the position of the machining path changes during the feed of the clamping tool, the machining tool can be automatically tracked. A separate sensor mechanism or other technique at the machining tool for seeking the machining path may be omitted.

The present invention is schematically shown in the drawings as an example. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

Figure 3:
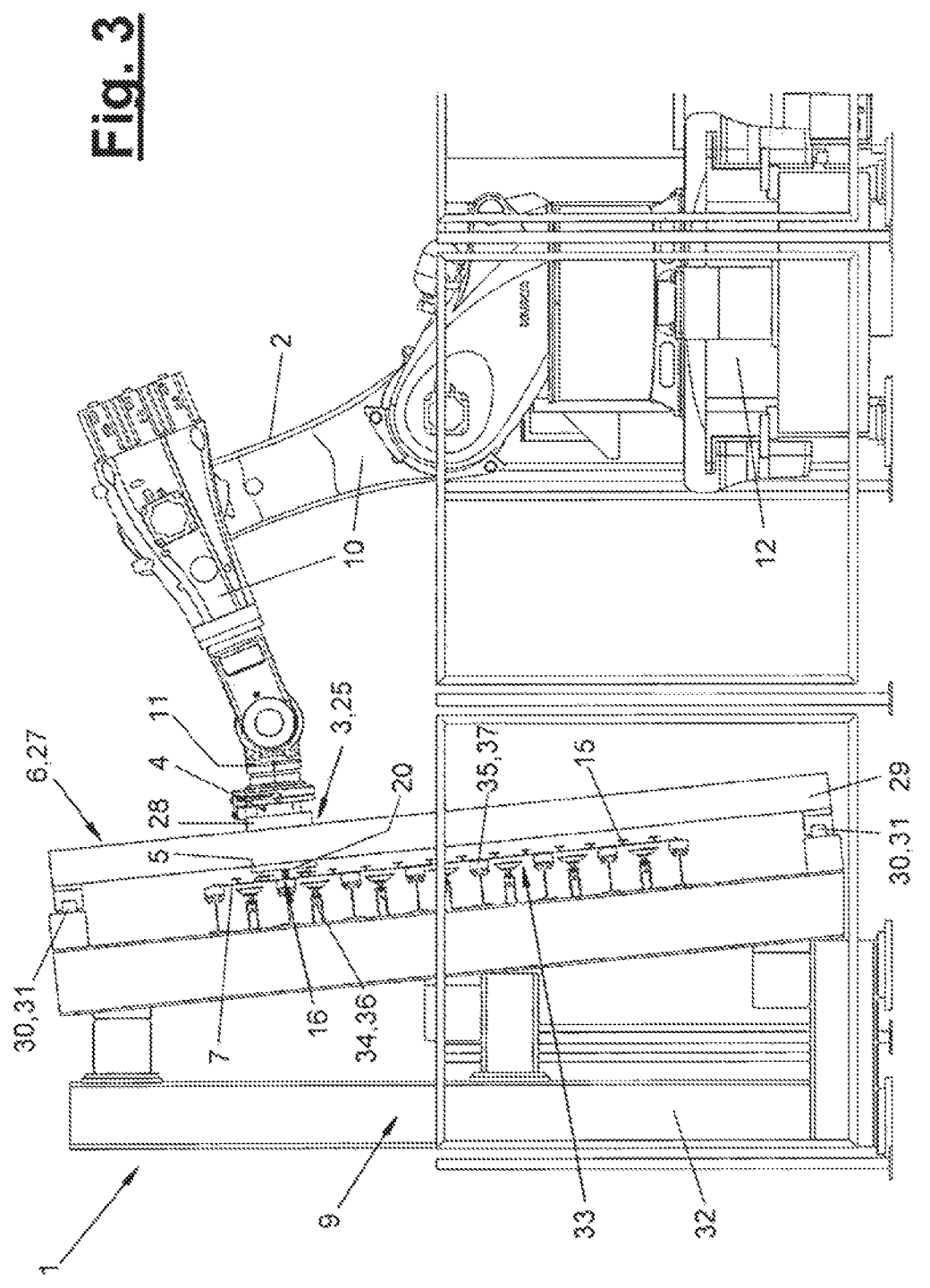

FIG. 3 is a lateral view of the arrangement from FIG. 2;

DESCRIPTION OF THE PREFERRED EMBODIMENTS

Figure 1:
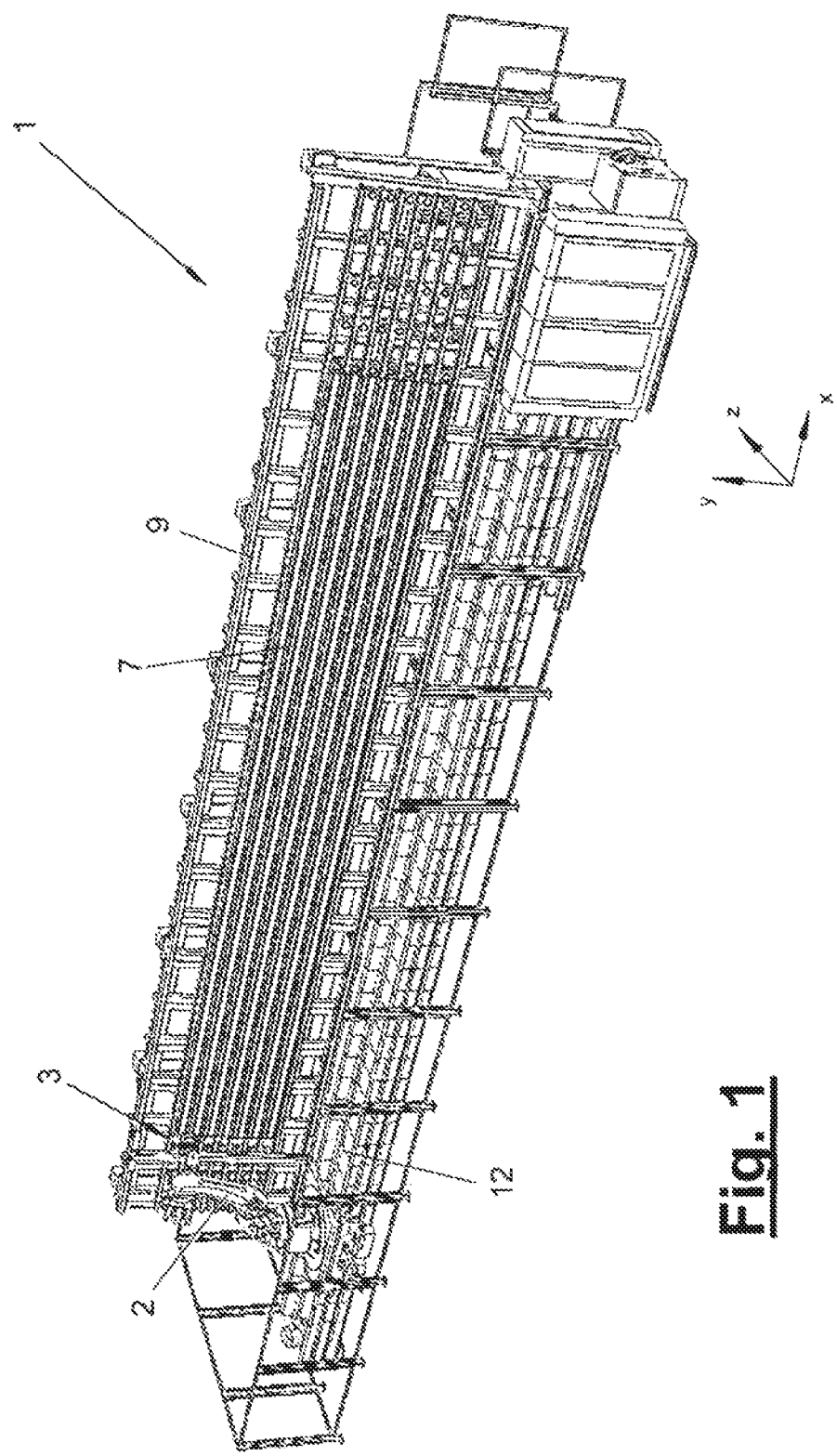
FIG. 1 is a perspective view of a machining device for an elongated multipart workpiece comprising a retaining device and an industrial robot.

Referring to the drawings, the present invention pertains to a retaining device (3) and to a retaining method for a multipart workpiece (7). The present invention further pertains to a machining device (1) and to a machining method comprising such a retaining device (3) and to a retaining method.

FIG. 1 shows a machining device (1) for a multipart workpiece (7) in a perspective view. This is a multipart workpiece (7), which is elongated in the direction of the spatial x axis, which may have, e.g., a plate-like shape. The workpiece (7) is configured, e.g., as a flat or arched roof of a vehicle, e.g., of a railway car.

The workpiece (7) consists of a plurality of workpiece parts (13, 14), which are configured, e.g., as elongated, narrow profiled sections. The profiled sections are configured as long roof panels with longitudinal webs, which are arranged on the one, inner panel surface and protrude obliquely from it. They preferably have a rectangular panel or plate shape.

The workpiece parts (13, 14) are machined in the machining device (1). Any desired machining process may be selected. It is preferably a joining process, especially a welding process. In the exemplary embodiments shown, the workpiece parts (13, 14) are connected to one another at their longitudinal edges facing each other by friction stir welding. A plurality of parallel workpiece parts (13, 14) or panels are connected to one another one after the other here and then together form the workpiece (7) or the roof.

The multipart workpiece (7) is machined by an industrial robot (2) with a machining tool (4) along a machining path (16). The machining path (16) preferably has an elongated and straight shape and extends essentially along the x axis. The path may, as an alternative, have a curved course. The path is formed, e.g., at the contact points, especially the longitudinal edges, of adjacent workpiece parts. The workpiece parts (13, 14) are butt jointed to one another and clamped together by means of the retaining device (3) at this machining path (16). The clamping may be directed obliquely to the machining path (16).

The retaining device (3) has a clamping tool (5) for clamping the workpiece parts (13, 14) together on the machining path (16). Further, the retaining device (3) contains a multi-axis guiding device (6) for the clamping tool (5). The clamping tool (5) can be moved independently by means of the guiding device (6) relative to the workpiece (7) during the machining process. In this case, the clamping tool clamps the workpiece parts (13, 14) together in a butt joint.

The clamping together is carried out with local limitation in the area of the current machining point (8), especially the weld joint. The local clamping together and machining point (8) move together synchronously with the feed of the clamping tool (5) along the machining path (16) or x axis.

Furthermore, the retaining device (3) may have a preferably stationary workpiece mount (9). The workpiece mount (9) has a mounting frame (32) with a mounting area (33) for the workpiece parts (13, 14) or the workpiece (7), which mounting area is preferably vertical and extends along the x axis. The mounting area (33) may be adapted to the geometry of the workpiece. In the exemplary embodiments being shown, it has a flat configuration, and, as an alternative, it may, e.g., also be single- or multi-axially arched, e.g., for an arched roof.

The workpiece parts (13, 14) can be rigidly or movably retained at the mounting area (33) in the clamping direction of the clamping tool (5). In the second case, the clamping tool (5) may position the workpiece parts (13, 14) relative to one another and clamp them together during its feed along the clamping or machining path (16).

The retaining device (3) may further have a control device for tracking the machining tool (4) on the machining path (16). The machining tool (4) is also positioned in a process-precise manner to the machining path (16) and moved synchronously during the feed of the clamping tool (5) due to the guiding and positioning of the clamping tool (5) in relation to the machining path (16).

In addition to the retaining device (3), the machining device (1) may comprise the industrial robot (2) and the machining tool (4) guided by it as well. The industrial robot (2) may be moved in the x direction along the workpiece mount (9). This will be explained in detail below.

The clamping tool (5) is intended and configured for gripping workpiece parts (13, 14) in a positive-locking manner, which parts are arranged parallel and next to one another, and for clamping them together in a butt joint at their adjacent edges, especially longitudinal edges. Two workpiece parts (13, 14) are preferably always gripped and clamped by the clamping tool (5). As an alternative, more than two workpiece parts (13, 14) may also be gripped and clamped.

The clamping tool (5) is guided at the workpiece (7) during the feed along the machining path (16). In the exemplary embodiments shown, the clamping tool (5) is guided along the machining path (16), which is preferably elongated and aligned along the workpiece parts (13, 14). The machining path (16) is preferably configured as a joint seam, especially a weld seam, at the workpiece (7) or its workpiece parts (13, 14). In the exemplary embodiments shown, the workpiece parts (13, 14) are connected to one another by friction stir welding at the butt-jointed longitudinal edges and at the machining path (16) there. Other welding methods, e.g., laser welding, arc welding or the like are possible, as an alternative.

During the feed, the clamping tool (5) is guided at a thrust bearing (15) of the workpiece (7) along the machining path (16), which is aligned parallel thereto. The thrust bearing (15) is formed by the longitudinal webs at the workpiece parts (13, 14), which protrude obliquely from the panel wall, in the exemplary embodiments shown. As an alternative, the thrust bearing (15) may also be formed by a longitudinal workpiece edge.

As FIGS. 2 through 6 illustrate, the clamping tool (5) has a frame (21) with a plurality of clamping elements (22, 23). The clamping elements (22, 23) mesh in a positive-locking manner with the thrust bearings (15) and have a slidable or rollable configuration here. The clamping elements (22, 23) are configured as rotatable pressing rollers, which act on the webs (15) on the outside, in the exemplary embodiments shown. The clamping elements (22, 23) may slide onto the workpiece parts (13, 14), which have a profiled configuration, and the webs thereof in case of a front-side axial feed.

A plurality of clamping elements (22, 23) are arranged and aligned on the frame (21) with mutual distance obliquely to the machining path (16). They grip behind the thrust bearings (15) and press the workpiece parts (13, 14) together. Their arrangement and distance are correspondingly adapted for this. In the exemplary embodiments shown, four clamping elements (22, 23) are arranged in two pairs. The upper pair of clamping elements (22) acts on the upper workpiece part (13) and the lower pair (23) acts on the lower workpiece part (14).

The clamping elements (22, 23) may be arranged rigidly on the frame (21). As an alternative, an adjusting device (25) may be present for an adjustment and workpiece adaptation of the clamping tool (5). In this case, e.g., the positions and relative positions of the clamping elements (22, 23) can be adjusted manually or by remote control or automatically and by means of a suitable drive of the adjusting device (25). An adjustment is, e.g., possible via an eccentric bearing or in another way. The pressing rollers (22, 23) may be configured as freely rotatable rollers. As an alternative, they may also be connected to a drive and driven rotatingly. In this case, the feed of the clamping tool (5) may be brought about by the drive motion of the pressing rollers (22, 23).

Figure 5:
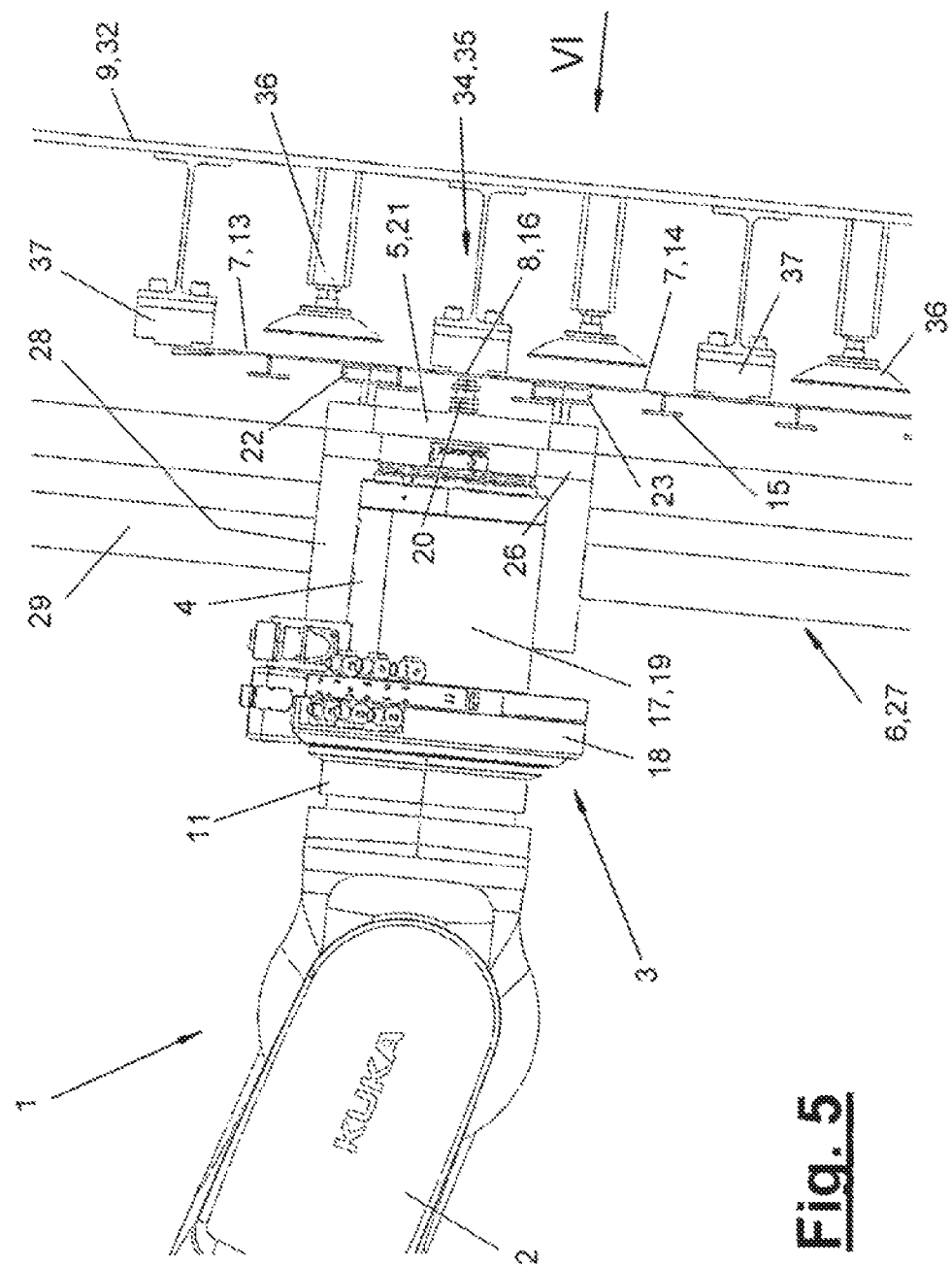
FIG. 5 is an enlarged lateral detail view of a clamping tool of the retaining device and of a machining tool.
Figure 6:
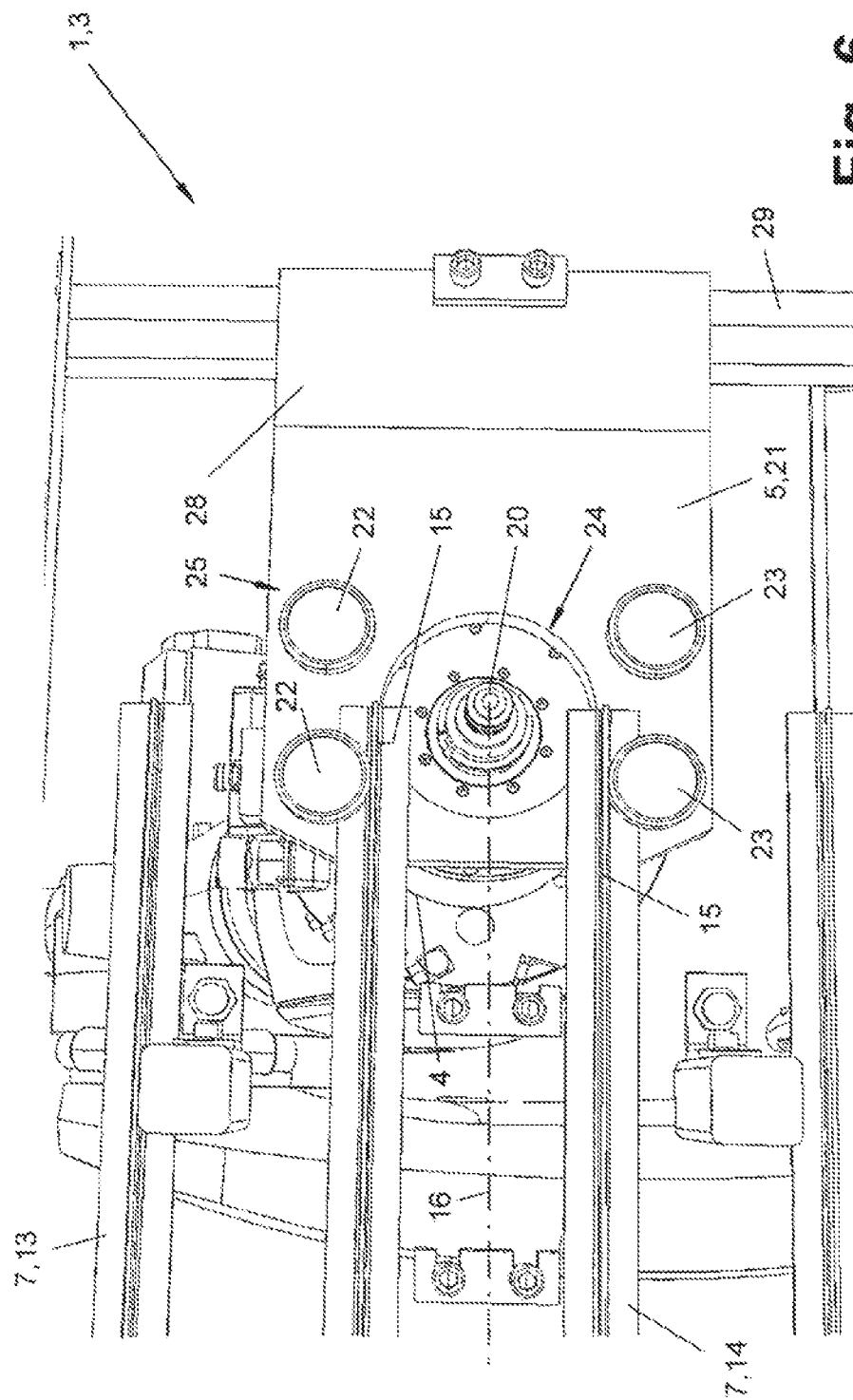
FIG. 6 is a rear top view of the clamping tool and the machining tool according to arrow VI from FIG. 5.

As FIGS. 5 and 6 illustrate, the frame (21) of the clamping tool (5) may have a plate-shaped configuration. As an alternative, a frame-shaped or other different configuration is possible. The frame (21) is arranged between the workpiece (7) or the workpiece parts (13, 14) and the industrial robot (2) or the machining tool (4) during the machining process. In this case, the frame (21) has a passage (24) for the machining tool (4). This passage may be configured, e.g., as a circular recess and passage opening in the frame (21).

In the machining technique and retaining technique being shown here, the machining tool (4) can be tracked by the clamping tool (5), especially in the x and y directions. For this purpose, a detection device (6) is provided and preferably associated with the clamping tool (5). The detection device (26) detects the mutual relative position of the clamping tool (5) and the machining tool (4). The detection device (26) is configured for this as a measuring device, which preferably operates in a contactless manner, and, as an alternative, with contact. It may have a plurality of, e.g., distance-measuring sensors. These may be optical, inductive or capacitive distance sensors or even contact sensors.

Figure 2:
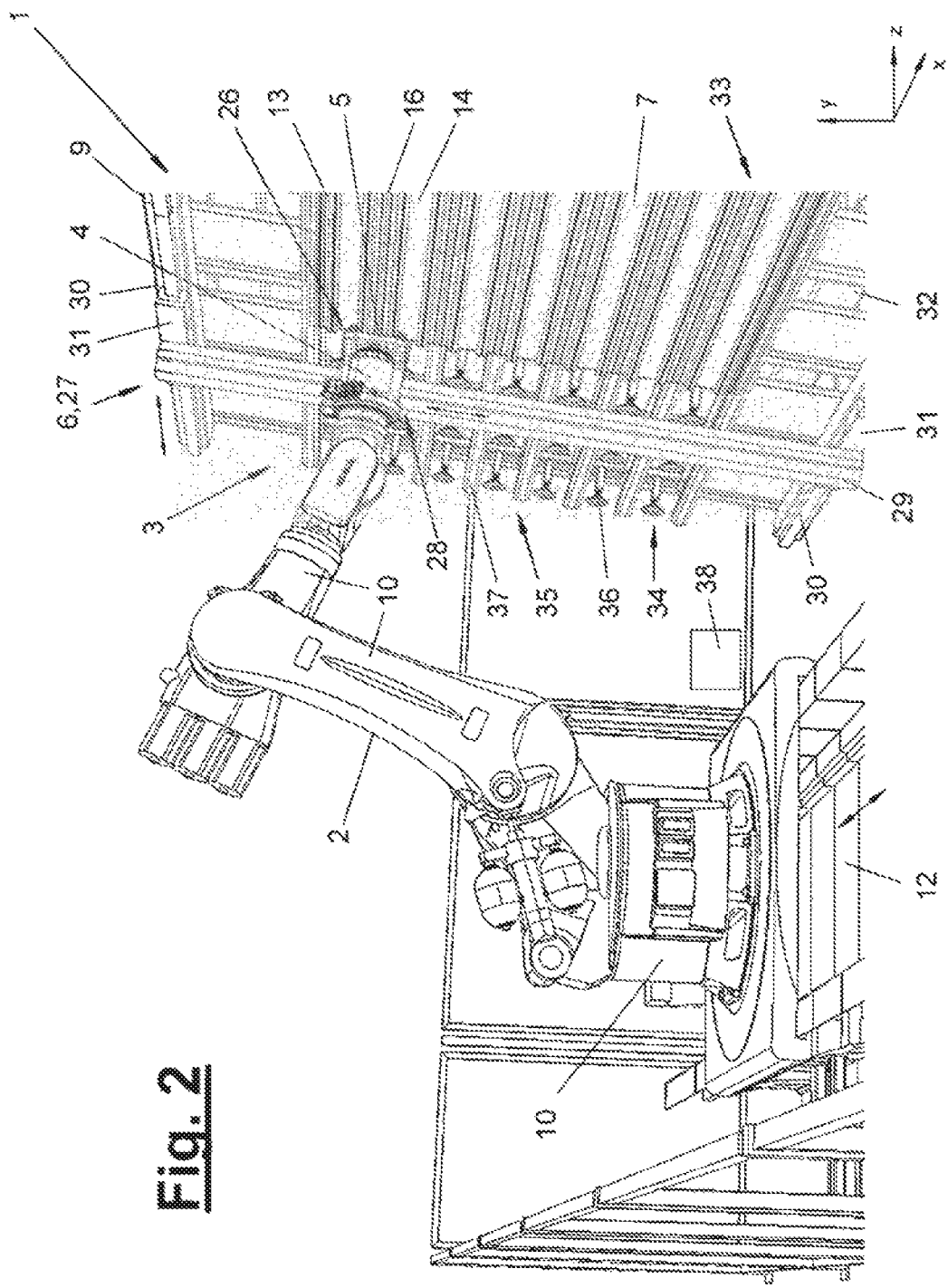
FIG. 2 is an enlarged perspective detail view of the retaining device and the industrial robot from FIG. 1.
Figure 4:
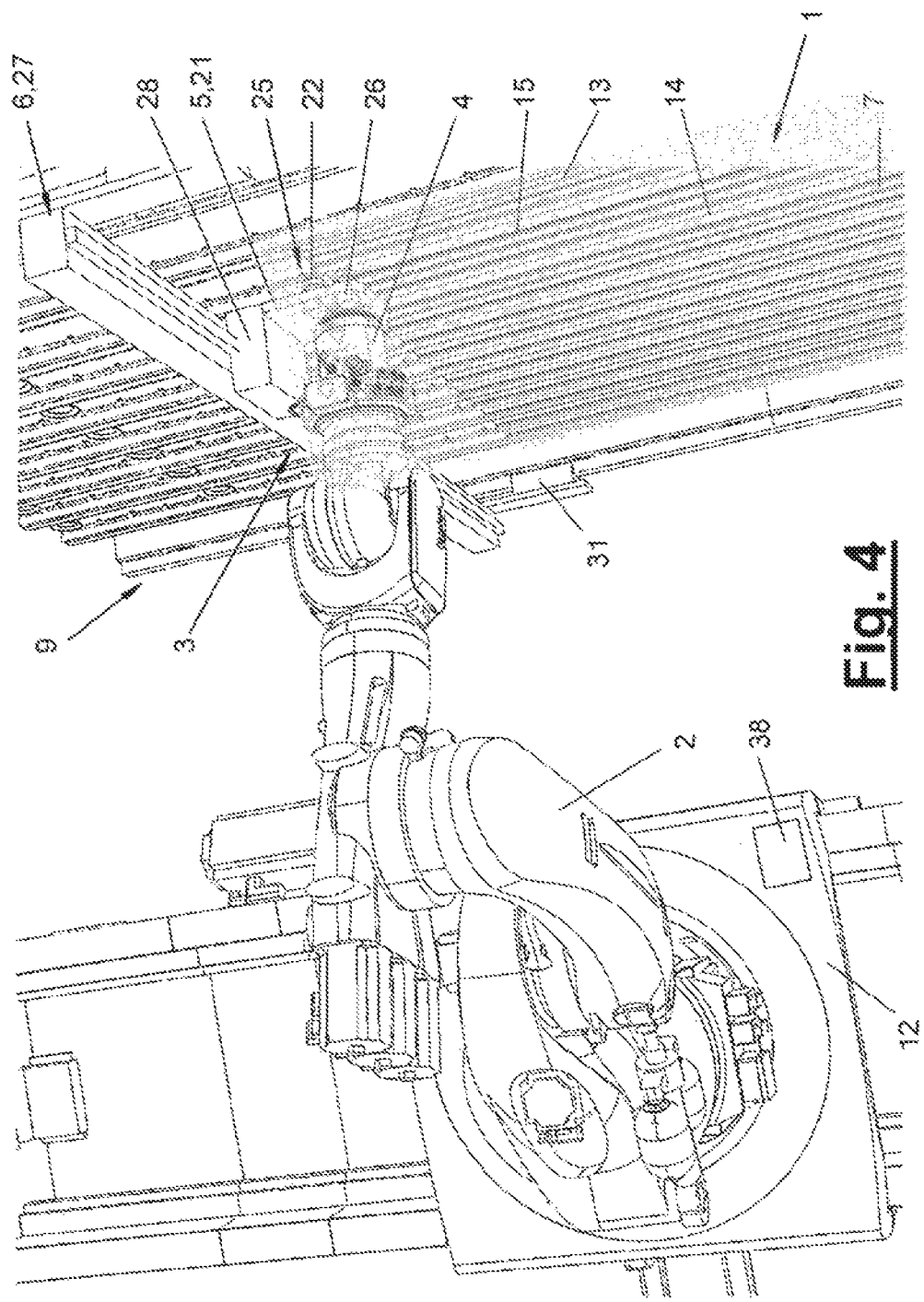
FIG. 4 is a top view of the arrangement from FIG. 2.

The detection device is connected for signal technology to the control device (38) shown in FIGS. 2 and 4, e.g., in a wireless manner or by cable. The control device (38) may in turn be connected to the robot control of the industrial robot (2). The robot control analyzes the signals of the detection device (26) and controls the industrial robot (2) such that it always retains the machining tool (4) in the same predefined relative position against the clamping tool (5). Corresponding to the feed of the clamping tool, the machining tool (4) is thereby also tracked by the industrial robot (2) along the machining path (16). The clamping tool (5) may be moved here obliquely to the machining path.

The detection device (26) is preferably arranged in the area of the passage (24) and on the frame (21). The detection device (26) is moved along during the feed of the clamping tool (5). As an alternative, the detection device (26) may be arranged at another point, e.g., at the machining tool (4). It may, as an alternative, also be configured as being stationary or as an independent measuring system, which is moved along at the workpiece mount (9).

In the exemplary embodiments shown, the clamping tool is fastened to a workpiece carrier (28) of the guiding device (6). The guiding device (6) is supported at the workpiece mount (9). The workpiece carrier (28) and the clamping tool (5) can be moved and guided via the guiding device (6) along and obliquely to the workpiece parts (13, 14) and to the machining path (16).

The guiding device (6) may have any desired, suitable configuration. It is configured as a pushing guide (27), e.g., as a carriage guide in the exemplary embodiments shown. The workpiece carrier (28) may be configured here as a carriage. The pushing guide or carriage guide (27) may have a vertical guide track (29) as well as a horizontal guide track (30). The guide tracks (29, 30) are arranged at right angles to one another. A plurality of guide tracks may be present. The horizontal guide track(s) (30) is/are arranged and aligned along the machining path (16) and along the main axis or longitudinal axis of the workpiece parts (13, 14).

In the exemplary embodiments shown, the guiding device (6) has its own feed drive (31). This feed drive is arranged, e.g., at the connection point or connection points of the vertical and horizontal guide tracks (29, 30). In the embodiments shown, a carriage each is arranged on the upper and lower horizontal guide track (30), the carriages in turn being connected to the vertical guide track (29). The feed drive (31) may be associated with one or both of these carriages.

As an alternative, the feed drive (31) may be associated with the clamping tool (5), wherein the feed drive is associated, e.g., in the above-mentioned manner with one or more pressing rollers (22, 23). As an alternative, the guiding device or the clamping tool (5) may have a trailing connection to the industrial robot (2). The trailing connection may replace the robot's own feed drive (31). The industrial robot (2) brings about hereby the feed of the guiding device (6) or of the clamping tool (5) along the longitudinal axis or machining path (16).

In the various exemplary embodiments, the workpiece carrier (28) is retained displaceably at the vertical track (29). In this case, the workpiece carrier (28) may be retained at the vertical track (29) floatingly or optionally with compensation for its own weight. The carriage position may change during the feed along the machining path (16) as a function of the respective alignment and position of the workpiece parts (13, 14) to be machined, preferably to be joined, especially when these parts are retained rigidly and permanently at the mounting area (33). When the workpiece parts (13, 14) have an oblique position, e.g., opposite the horizontal guide track (30), the workpiece carrier (28) correspondingly changes its position at the vertical guide track (29) during the feed. As a result, the workpiece parts (13, 14) do not need to have a high absolute position accuracy at the mounting area (33). It is sufficient if they are positioned relative to one another in a manner suitable for clamping.

As an alternative, the workpiece carrier (28) may be equipped with a drive for the travelling motion along the vertical track (29). This drive may be controllable in order to position the workpiece carrier (28) in conjunction with a corresponding detection device and the clamping tool (5) at the workpiece parts (13, 14) to be machined, especially to be joined.

In another variant with or without drive, the carriage position of the workpiece carrier (28) may be fixed at the vertical tract (29) in case of the feed motion, so that possible incorrect positions of the workpiece parts (13, 14) are corrected. For this purpose, the workpiece parts (13, 14) may be moved by the clamping tool (5) and displaced along their principal plane. The workpiece parts (13, 14) may for this be retained movably at the mounting area (33) in the clamping direction of the clamping tool (5).

The mounting area (33) of the workpiece mount (9) is preferably aligned upright or vertically. It may have a vertical and slightly oblique alignment along the y axis here. An upright mounting area (33) is favorable for the robot kinematics and for the reachability of a large-area workpiece (7) or of a plurality of parallel workpiece parts (13, 14).

The workpiece mount (9) has a fixing device (34) and a support device (35) for the workpiece (7) at the mounting area (33). The principal plane of the workpiece (7) or its workpiece parts (13, 14) is aligned parallel to the mounting area (33). The fixing device (34) may fix the workpiece (7) or its workpiece parts (13, 14) permanently. As an alternative, the fixing device (34) may permit a limited workpiece motion, especially in the principal plane of the mounting area (33). This makes possible the aforementioned displacement of the workpiece parts (13, 14) by the clamping tool (5). The support device (35) supports the workpiece (7) or its workpiece parts (13, 14) in a direction obliquely to the principal plane of the mounting area (33).

In the exemplary embodiments shown, the fixing device has a plurality of preferably controllable fixing elements (36), which are configured, e.g., as suction units. As an alternative, the fixing elements (36) may be configured in another manner, e.g., as electromagnets, electrostatic retainers or the like. The fixing elements (36), which are aligned, e.g., in the z axis, act on the rear side of the workpiece (7) or of the workpiece parts (13, 14) and are positioned for this corresponding to the geometry of the workpiece. The fixing elements (36) are arranged, e.g., point by point or in a strip-shaped manner with a mutual distance and distributed in a preferably uniform grid at the mounting area (33). The fixing device (34) has further an operating device for the fixing elements (36), e.g., a controllable suction or vacuum device.

The support device (35) has a support base (37) for the workpiece (7) or the workpiece parts (13, 14). The support base (37) is configured, e.g., as a support strip, which extends along the x axis. It is located in the area of the machining path (16) and supports here the edges of the workpiece parts (13, 14) to be joined from behind against the pressing force of the machining tool (4) in the z direction.

The industrial robot (2) has a multi-axis and multi-link configuration and has any desired number of rotatory and/or translatory robot axes. In the exemplary embodiments shown, it is configured as an articulated arm robot or bent arm robot. It has, e.g., four robot links (10), which are formed by a base, a rocker, an extension arm and a multi-axis robot hand with a movable, preferably rotating output element (11). The robot links (10) are connected to one another in an articulated manner. The machining tool (4) is arranged permanently or detachably at the output element (11). In this case, an automatic change coupling may be interconnected when needed.

The industrial robot (2) is equipped with an auxiliary axis (12) for motion in the x direction along the workpiece mount (9). This may be, e.g., a linear travel axis, the industrial robot (2) with its base being arranged on the carriage of the travel axis (12). As an alternative, the auxiliary axis (12) may be configured as a rocker arm construction or in another manner. More than one auxiliary axis (12) may also be present. The industrial robot (2) has six rotatory robot axes and one or more auxiliary axes (12) in the exemplary embodiments shown.

In the exemplary embodiments being shown, the machining tool (4) is configured as a joining tool, especially as a friction stir welding tool. The machining tool (4) has a body (17) with a robot connection (18) for the connection to the output element (11) or to an optionally interconnected automatic change coupling. Operating materials may be supplied to the machining tool (4) via the change coupling or in another manner, e.g., via an external line feed.

The machining tool (4) has a machining element (20), which is configured, e.g., as a joining element, especially as a friction stir welding pin. The machining tool (4) has further a drive (19) for the process motion, especially rotary motion of the machining element (20). The drive (19) may optionally have a multipart configuration and also ensure the feed of the machining element (20).

In case of friction stir welding, the friction stir welding pin (20) is inserted between the adjacent longitudinal edges of the workpiece parts (13, 14) at the machining path and rotated about the longitudinal axis thereof, wherein the adjacent workpiece areas are plasticized by the developed frictional heat. The machining element (20) or the friction stir welding pin is moved along the machining path (16) by the industrial robot (2), wherein the frictional front moves with the feed and the plasticized workpiece areas are again connected and welded to one another in the direction of motion behind the friction stir welding pin (20). The friction stir welding pin (20) may be pressed against the workpiece parts (13, 14) by the machining tool (4) with a pressing force in the z direction or in a direction perpendicular to the workpiece surfaces.

Different variants of the embodiments shown and described are possible. In particular, the features of the various exemplary embodiments may be combined with and optionally also replaced by one another as desired.

The mounting area (33) may, as an alternative, have a horizontal position with a predominantly horizontal direction component An industrial robot (2) with at least several translatory axes and optionally with a portal construction is suitable for this.

While specific embodiments of the invention have been shown and described in detail to illustrate the application of the principles of the invention, it will be understood that the invention may be embodied otherwise without departing from such principles.

The invention claimed is:

1. A retaining device for several workpiece parts which can be machined by an industrial robot, comprising a machining tool, along a machining path, the retaining device comprising:
a clamping tool;
a workpiece mount configured to retain the plurality of workpiece parts movably in a clamping direction of the clamping tool and to position the plurality of workpiece parts parallel to and adjacent to one another with longitudinal edges of the plurality of workpiece parts disposed adjacent to one another as adjacent longitudinal edges, wherein the workpiece mount comprises a plurality of controllable fixing elements configured as suction units, electromagnets or electrostatic retainers, and a support device for supporting the plurality of workpiece parts; and
a multi-axis guiding device configured to guide the clamping tool on the retained plurality of workpiece parts along the machining path, which machining path follows the adjacent longitudinal edges and configured to independently move clamping tool relative to the retained plurality workpiece parts during machining, wherein
the clamping tool is configured for positive locking gripping of the plurality of workpiece parts as the clamping tool is moved relative to the retained plurality of workpiece parts, which plurality of workpiece parts are arranged parallel to and next to one another, and
the clamping tool is configured to exert a clamping force on the plurality of workpiece parts in the clamping direction of the clamping tool to press together the adjacent longitudinal edges of the plurality of workpiece parts for clamping the plurality of workpiece parts together at the adjacent longitudinal edges to form a butt joint of the adjacent longitudinal edges.

2. A retaining device in accordance with claim 1, wherein the retaining device comprises a control device for adjusting the machining tool on the machining path.

3. A retaining device in accordance with claim 1, wherein the clamping tool is guided at the workpiece as the clamping tool is moved relative to the retained plurality of workpiece parts.

4. A retaining device in accordance with claim 1, wherein the clamping tool comprises a frame with a plurality of clamping elements and the plurality of clamping elements are aligned by a mutual distance obliquely to the machining path.

5. A retaining device in accordance with claim 1, wherein the clamping tool comprises a detection device for the machining tool wherein the detection device detects a relative position, of the clamping tool and the machining tool, to each other.

6. A retaining device in accordance with claim 1, wherein the multi-axis guiding device is supported on the workpiece mount wherein the guiding device is configured as a pushing guide comprising a carriage guide.

7. A retaining device in accordance with claim 1, wherein the multi-axis guiding device or the clamping tool has an associated feed drive wherein the guiding device or the clamping tool has a trailing connection to the industrial robot.

8. A machining device for a multipart workpiece, the machining device comprising:
a multi-axis industrial robot;
a machining tool that is guided by the industrial robot; and
a retaining device for the workpiece, the retaining device comprising:
a clamping tool;
a workpiece mount configured to retain a plurality of workpiece parts movably in a clamping direction of the clamping tool and to position the plurality of workpiece parts parallel to and adjacent to one another with longitudinal edges of the plurality of workpiece parts disposed adjacent to one another as adjacent longitudinal edges, wherein the workpiece mount comprises a plurality of controllable fixing elements configured as suction units, electromagnets or electrostatic retainers, and a support device for supporting the plurality of workpiece parts; and a multi-axis guiding device configured to guide the clamping tool on the retained plurality of workpiece parts along the machining path, which machining path follows the adjacent longitudinal edges and configured to independently move the clamping tool relative to the retained plurality workpiece parts during machining, wherein the clamping tool is configured for positive locking gripping of the plurality of workpiece parts as the clamping tool is moved relative to the retained plurality of workpiece parts, which plurality of workpiece parts are arranged parallel to and next to one another, and the clamping tool is configured to exert a clamping force on the plurality of workpiece parts in the clamping direction of the clamping tool to press together the adjacent longitudinal edges of the plurality of workpiece parts for clamping the plurality of workpiece parts together at the adjacent longitudinal edges to form a butt joint of the adjacent longitudinal edges.

9. A machining device in accordance with claim 8, wherein the machining device is configured as a joining device, comprising a friction stir welding device.

10. A machining device in accordance with claim 8, wherein the machining tool is configured as a joining tool, comprising a friction stir welding tool.

11. A machining device in accordance with claim 8, wherein the machining tool is aligned in a synchronously and movably with the feed of the clamping tool and to the machining path, wherein the clamping tool exerts the clamping force on the workpiece at each machining point along the machining path.

12. A machining device in accordance with claim 8, wherein the industrial robot comprises a plurality of robot links with translatory and/or rotatory robot axes wherein the industrial robot comprises an auxiliary linear travel axis.

13. A method for machining a plurality of workpiece parts, the method comprising:

providing a machining device comprising: a multi-axis industrial robot; a machining tool that is guided by the industrial robot; and a retaining device comprising: a clamping tool; a workpiece mount configured to retain the plurality of workpiece parts movably in a clamping direction of the clamping tool and to position the plurality of workpiece parts parallel to and adjacent to one another with longitudinal edges of the plurality of workpiece parts disposed adjacent to one another as adjacent longitudinal edges wherein the workpiece mount comprises a plurality of controllable fixing elements configured as suction units, electromagnets or electrostatic retainers, and a support device for supporting the plurality of workpiece parts; and a multi-axis guiding device configured to guide the clamping tool on the retained plurality of workpiece parts along the machining path, which machining path follows the adjacent longitudinal edges and configured to independently move the clamping tool relative to the retained plurality workpiece parts during machining, wherein the clamping tool is configured for positive locking gripping of the plurality of workpiece parts as the clamping tool is moved relative to the retained plurality of workpiece parts, which plurality of workpiece parts are arranged parallel to and next to one another, and the clamping tool is configured to exert a clamping force on the plurality of workpiece parts in the clamping direction of the clamping tool to press together the adjacent longitudinal edges of the plurality of workpiece parts for clamping the plurality of workpiece parts together at the adjacent longitudinal edges to form a butt joint of the adjacent longitudinal edges;

machining the plurality of workpiece parts by an industrial robot, comprising a machining tool, along a machining path;

retaining the plurality of workpiece parts by the retaining device including clamping the workpiece parts with the clamping tool of the retaining device on the machining path; and moving the clamping tool independently relative to the workpiece by means of the multi-axis guiding device during the machining wherein the clamping tool positive-lockingly grips the plurality of workpiece parts, which plurality of workpiece parts are arranged parallel to and next to one another, and are clamped together in a butt joint at adjacent longitudinal edges.

14. A method in accordance with claim 13, wherein the workpiece parts to be machined are clamped locally at a machining point, wherein a clamping point moves along synchronously with the machining feed along the machining path and workpiece defects, and positioning errors are compensated during the machining feed of the clamping tool.

15. A method in accordance with claim 13, wherein the machining tool of the workpiece-guiding industrial robot, is automatically tracked the clamping tool by means of a detection technique.

16. A method in accordance with claim 13, wherein elongated workpiece parts, which are butt jointed at parallel longitudinal edges, are clamped and machined and joined by friction stir welding.

17. A method in accordance with claim 13, wherein the machining tool is moved synchronously with the feed of the clamping tool and is thereby aligned to the machining path, wherein the clamping tool exerts the clamping force on the workpiece at each machining point movable along the machining path.

18. A method in accordance with claim 13, wherein the clamping tool is guided at a thrust bearing of the workpiece, at a workpiece edge and/or at a web during the feed.

* * * * *